United States Patent [19]

Kobayashi et al.

[11] Patent Number: 5,045,369
[45] Date of Patent: Sep. 3, 1991

[54] PLASTIC CONTAINER AND METHOD FOR MANUFACTURING THE SAME

[75] Inventors: Yukio Kobayashi; Hidenori Azegami; Hitoshi Sasaki, all of Kawasaki, Japan

[73] Assignee: Ajinomoto Co., Inc., Tokyo, Japan

[21] Appl. No.: 347,271

[22] Filed: May 4, 1989

[30] Foreign Application Priority Data

| May 6, 1988 | [JP] | Japan | 63-109976 |
| Jul. 11, 1988 | [JP] | Japan | 63-172447 |
| Jul. 15, 1988 | [JP] | Japan | 63-176347 |

[51] Int. Cl.$^5$ ............................................. B65D 25/00
[52] U.S. Cl. .................................. 428/36.7; 220/453; 428/36.4; 428/475.5; 428/480; 428/518; 428/520
[58] Field of Search ............ 428/35.4, 36.7, 518, 428/520, 36.4, 480, 475.5; 220/453

[56] References Cited

U.S. PATENT DOCUMENTS

| 4,511,610 | 4/1985 | Yazaki et al. | 428/36.7 |
| 4,526,823 | 7/1985 | Farrell et al. | 428/36.7 |
| 4,705,708 | 11/1987 | Briggs et al. | 428/518 |
| 4,713,296 | 12/1987 | Aoyama et al. | 428/518 |
| 4,792,488 | 12/1988 | Shirmer | 428/518 |

Primary Examiner—James Seidleck
Attorney, Agent, or Firm—Oblon, Spivak, McClelland, Maier & Neustadt

[57] ABSTRACT

A container substantially made of plastic materials and having a gas barrier property. The container has a wall including a laminated sheet which comprises an inner layer and an outer layer both made of a thermoplastic material and an intermediate barrier layer between the inner and outer layers and made of a resin material of which gas barrier property can be improved by stretching. The intermediate layer is held between the inner and outer layers in a stretched state. A rigid layer of a large thickness may be provided outside the outer layer. In manufacturing the container, the intermediate layer may be in a stretched state when the laminate is provided. The rate of stretching can be increased when the laminated sheet is formed into the shape of the container.

7 Claims, 4 Drawing Sheets

PLASTIC CONTAINER AND METHOD FOR MANUFACTURING THE SAME

BACKGROUND OF THE INVENTION

1. Field of the Invention

The present invention relates to a container made of a laminated plastic sheet and a method for manufacturing the same. More particularly, the present invention pertains to a container having a gas-barrier characteristics and a method for manufacturing the same.

2. Description of the Prior Art

It is desirable that containers for foodstuffs are capable of protecting the contents therein so that the contents do get adverse effects even after the contents have been handled for transportation and stored for an extended period of time under a room temperature, and that they are capable of being subjected to heating and cooking with a microwave oven. Further, those containers which are subjected to a retort sterilization have to be of a property which can withstand a high temperature and a high humidity to which the containers are subjected. Plastic material is preferred for manufacturing such containers because of the lower cost and readiness for the manufacture.

Conventionally, containers for foodstuffs have been manufactured by means of for example forming a sheet of a plastic material under an elevated temperature, a blow forming, or an injection molding. Since containers for foodstuffs must be harmless to the contents therein and are required to be capable of providing a barrier to liquid and gas which may penetrate from the inside of the container to the outside and to gas which may penetrate from the outside to the inside of the container, it is recommendable to manufacture the container from a laminated sheet made of a plurality of layers respectively having properties as required. A preferable method for the manufacture of the container is to form the sheet under an elevated temperature.

Conventionally, such containers have been manufactured from a sheet of a plastic material such as polystylene resin, ABS resin or polypropylene resin by forming the sheet under an elevated temperature. However, the conventional method cannot provide a container having a satisfactory gas barrier property so that the container manufactured through the conventional method has only a limited use. In order to provide a gas barrier property, it has been known to use a laminated sheet including a metal foil covered at the opposite sides by plastic layers such as layers of polypropylene layers and form the sheet into a desired configuration under an elevated temperature. The conventional method using such a laminated sheet is however limited to the manufacture of a container of a relatively shallow configuration such as a tray because of the metal foil contained in the laminated sheet. Therefore, it has not been possible to manufacture with this method a container of a deep configuration such as a cup, bowl and the like. It should further be noted that the container thus manufactured from the laminated sheet is not suitable for a cooking by a microwave oven.

It has been known that some kinds of polymer material such as polyvinylidene chloride copolymer, ethylenevinyl-alcohol copolymer has an improved gas barrier property when it is stretched. When such resin material is used for the manufacture of a container, the forming must be conducted with the resin material in a softened condition so that the stretched condition can be maintained. However, when a container is thus formed with the resin material in a softened condition, it cannot maintain its shape under a high temperature to which the container will subjected when a hot content is to be charged or when the content is being subjected to a retort sterilization. As the result, the container may be distorted under such high temperature. If the forming is carried out with the resin material in a molten condition, it will no longer be possible to maintain the stretched condition of the material so that the property of the material cannot be utilized to provide an improved gas barrier property.

SUMMARY OF THE INVENTION

It is therefore an object of the present invention to provide a container which utilizes the property of a polymer material in which the gas barrier property can be improved under a stretched condition but in which the shape of the container can be maintained even under an elevated temperature.

Another object of the present invention is to provide a plastic container which has an improved gas barrier property but can maintain its shape even under an elevated temperature.

Still further object of the present invention is to provide a process for manufacturing such a plastic container.

According to the present invention, the above and other objects can be accomplished by manufacturing a container with an inner layer and an outer layer both made of a thermoplastic material and a barrier layer between the inner and outer layers. The barrier layer is made of a resin material which is of a property in which the gas barrier property is improved by stretching. The barrier layer is held between the inner and outer layers in a stretched condition.

Preferably, the inner and outer layers are made of polyolefin resin such as polypropylene or polyethylene. Polyester, polycarbonate and polymethylpentene may also be used. The barrier layer may preferably be made of stretched polyvinylidene copolymer or stretched ethylenevinylalcohol copolymer. Acrylonitrite copolymer, polybutyleneterephthalate, nylon-6, metaxylenediamine condensed polymer of adipic acid may be used. Further, the barrier layer may be of two-layer structure including a first barrier layer of for example stretched polyvinylidene chloride copolymer and a second barrier layer of for example stretched ethylenevinylalcohol copolymer. In this instance, it is preferred to arrange the first barrier layer at a side adjacent to the inner layer and the second barrier layer at a side adjacent to the outer layer. It is preferred to provide a rigid layer of a large thickness outside the outer layer. The rigid layer may preferably contain inorganic material. The outer surface of the rigid layer containing the inorganic material may preferably be coated with a coating layer of a thermoplastic resin.

The present invention further provides a method for manufacturing a container. The method in accordance with the present invention is characterized by steps of providing a laminated sheet including an inner layer made of a thermoplastic resin, an outer layer made of a thermoplastic resin and an intermediate layer made of a resin having a property in which gas barrier property can be improved by stretching the resin, the intermediate layer being held between the inner and outer layers, and forming the laminated sheet into a configuration of the container under a temperature which is higher than the melting temperature of the inner and outer layers but lower than the melting temperature of the intermediate layer.

Where the inner and outer layers are maintained substantially the same in temperature with the barrier or intermediate layer during the forming process, it is necessary to provide the barrier layer with a material which has a melting temperature higher than the melting temperature of the inner and outer layer. Where the heating process is carried out by applying heat outside the inner and outer layers to produce a temperature gradient between the inner and outer layers and the barrier layer, the material for the barrier layer may have a melting temperature which is substantially the same as that of the inner and outer layers because it is possible to maintain the barrier layer at a temperature in which the barrier layer can be stretched due to the temperature gradient.

In carrying out the method described above, it is preferable to proceed with the forming step after a rigid layer of a large thickness is provided outside the outer layer of the laminated sheet. According to a preferable mode of the present invention, the method is carried out by providing a laminated sheet comprising an inner layer made of a polypropylene film, an outer layer made of polypropylene film and an intermediate layer between the inner and outer layers and made of a film of polyvinylidene chloride copolymer, providing outer side said outer layer with a rigid layer containing organic material, forming the laminated sheet with the rigid layer into a desired shape under a temperature which is higher than the melting temperature of the inner and outer layers but lower than the melting temperature of the intermediate layer so that the polyvinylidene chloride film in the intermediate layer is stretched during the forming step. In this instance, the intermediate layer may be of a stretched condition from the beginning. Then, the stretch rate of the film in the intermediate layer can be increased during the forming to thereby improve the gas barrier property further.

In the forming step, the temperature may be such that the inner and outer layers are brought into a molten condition and the intermediate layer into a softened condition. In providinq the riqid layer, a surface layer of a thermoplastic resin may simultaneously be provided outside the rigid layer. The rigid layer and the surface layer may be formed simultaneously by extruding the materials for the layers onto the laminated sheet.

According to the features of the present invention, the container has a structure including a barrier layer disposed between the inner and outer layers and made of a resin material having a property in which the gas barrier property is improved when it is stretched. The barrier layer is in a stretched condition so that it has an improved gas barrier property. The barrier layer which is in a stretched condition has a tendency of shrinking when it is subjected to heat under a high humidity which may be applied during retort sterilization, however, since the inner and outer layers are not in a stretched condition, they are not distorted even under such condition. It is therefore possible to prevent the shrinkage of the barrier layer and the barrier layer can be maintained in a highly stretched condition. As the result, it is possible to provide the gas barrier layer with an improved gas barrier property. Further, it is possible to prevent thermal deformation of the container.

According to the method of the present invention, there is first provided a laminated sheet including an inner and outer layers both made of a thermoplastic resin and an intermediate layer disposed between the inner and outer layers and made of a resin material having a property in which the gas barrier property can be improved by stretching and the laminated sheet is then formed into a desired shape under a temperature which is higher than the melting temperature of the inner and outer layers but lower than the melting temperature of the intermediate layer. In the forming step, the intermediate layer is subjected to stretching, of which stretch rate will be 2 to 10. Thus, the gas barrier property of the intermediate layer is improved. In the case where the intermediate layer is in advance stretched, the stretch rate is further increased by the forming and the barrier property is further improved.

The rigid layer outside the outer layer can be made of inorganic materials which are of low price. Therefore, an advantage is obtained from the economical point of view as compared with the case where a required rigidity is provided solely by the outer layer. The rigid layer may be made of a mixture of polypropylene, calcium carbide, talc, silica and/or mica. In this case, it is possible to provide a container which will be free from shrinkage under heat which may be applied to the container during a retort sterilization. Further, the container of this structure can readily be burnt when it is to be disposed. It should further be noted that scrap materials may also be used to form the rigid layer. For example, scrap materials may be crashed and mixed with polypropylene and inorganic materials.

The above and other objects and features of the present invention will become apparent from the following descriptions of preferred embodiments taking reference to the accompanying drawings.

DESCRIPTION OF THE PREFERRED EMBODIMENT

Figure 1:
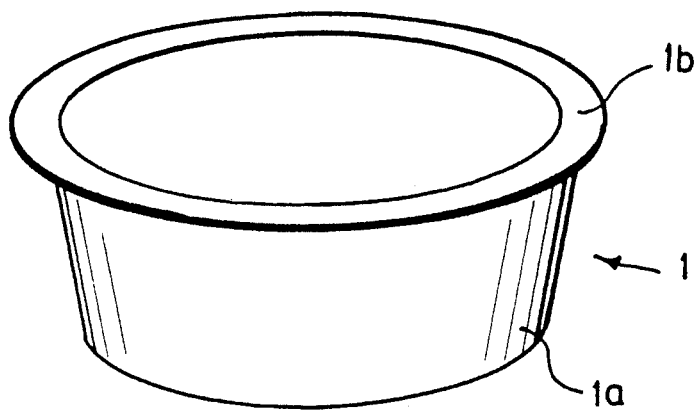
FIG. 1 is a perspective view of a container in accordance with one embodiment of the present invention.
Figure 2:
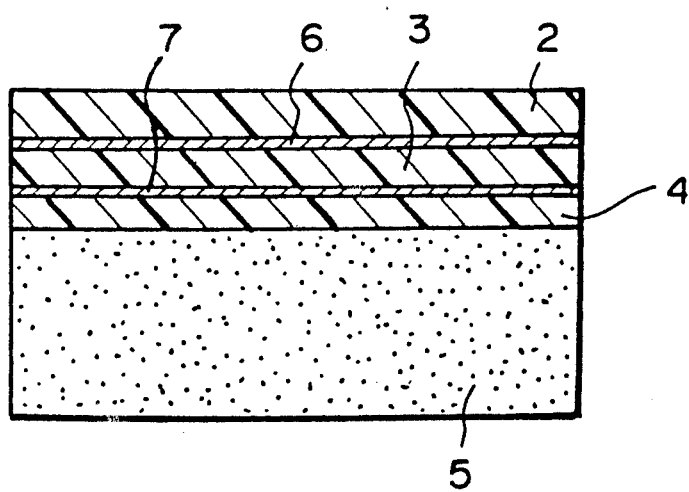
FIG. 2 is a sectional view showing the structure of the wall of the container.

Referring to the drawings, particularly to FIG. 1, there is shown a container 1 for foodstuffs which includes a container body 1a made from a sheet by hot pressing and having an annular flange 1b provided around the upper periphery of the body 1a. After content is charged, a lid (not shown) is attached to the flange 1b by for example heat sealing. Referring to FIG. 2, the container 1 is shown as being made of a laminated sheet comprising an inner layer 2, a barrier layer 3 which is located at one side of the inner layer 2 and an outer layer 4 located along the outer side of the barrier layer 3. A rigid layer 5 is located along the outer side of the outer layer 4. The inner layer 2 is made of a polypropylene film having a thickness of 30 to 200 μm. It is preferable that the inner layer 2 is 50 to 150 μm thick. The barrier layer 3 is made of a stretched polyvinylidene chloride copolmer film of 10 to 150 μm thick, preferably 15 to 100 μm thick. An adhesive layer 6 of polyurethane is provided between the inner layer 2 and the outer layer 3. The outer layer 3 is made of a material similar to that of the inner layer 2 and is 10 to 200 μm thick, preferably 20 to 100 μm thick. There is provided an adhesive layer 7 of polyurethane similar to the layer 6 between the barrier layer 3 and the outer layer 4. The rigid layer 5 is made of a mixture of polypropylene with calcium carbide, talc, silica, mica and the like and has a thickness of 200 to 2000 μm, preferably 300 to 1500 μm.

In manufacture, a laminated sheet comprising the inner layer 2, the barrier layer 3 and the outer layer 4. The rigid layer 5 is then formed outside the outer layer 4 by extruding the aforementioned mixture in a molten form. Thereafter, the laminated sheet with the rigid layer 5 is placed in a mould and press forming is carried out under a temperature which is higher than the melting point of the material of the inner layer 2 and the outer layer 4 but lower than the melting point of the material of the barrier layer 3. In this forming step, the polyvinylidene chloride film constituting the barrier layer 3 is stretched with a stretching rate of 2 to 10. By this stretching, the barrier layer possesses an improved gas barrier property. If a higher gas barrier property is required, a stretched film may be used for the barrier layer 3 in providing the laminated sheet. If for example a biaxial stretch film of a stretch rate of approximately 5 is used for providing the laminated sheet, it is possible to obtain a higher stretch rate so that a further improved gas barrier property will be obtained.

Polypropylene has a melting point of 140° to 160° C. whereas polyvinylidene chloride copolymer has a melting point of 160° C. It will therefore be noted that in the case where polyvinylidene chloride copolymer of non-stretched form is used for the barrier layer 3 in forming the laminated sheet, it is required to select polypropylene having a relatively low melting point. Polyvinylidene chloride copolymer of a stretched condition has a melting point of approximately 170° C., the melting point of the barrier layer can always be higher than the melting point of the inner and outer layers.

The container 1 thus formed has a gas barrier layer 3 made of a stretched film. Therefore, it has an excellent gas barrier property and is suitable for storing content for a prolonged period of time. Since the inner and outer layers are of non-stretched resin, it is unlikely that the container is deformed by heat to which the container may be subjected after forming process. It should therefore be understood that even when the container is subjected to a retort sterilization after the container is charged with content and sealed, it is unlikely that the container is deformed under the heat to which the container is subjected during the sterilization. Further, the barrier layer 3 can be maintained in a stretched condition even after the sterilization. For the purpose of maintaining the shape of the container, the rigid layer 5 may not be necessary if the outer layer 4 is sufficiently thick. However, from the viewpoint of economy, it is preferable to make the outer layer 4 as thin as possible and to provide the shape maintaining ability by the rigid layer 5.

Figure 3:
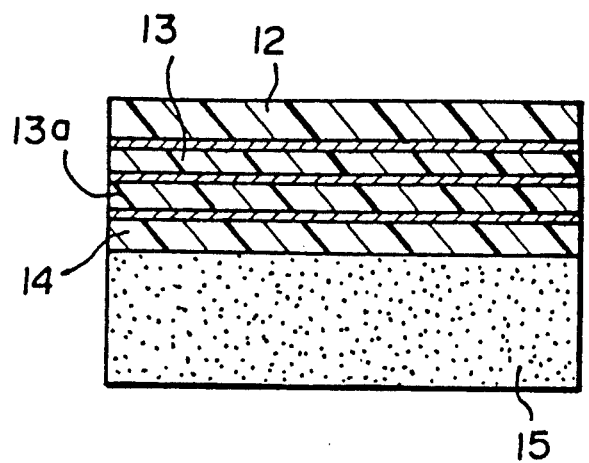
FIG. 3 is a sectional view showing another example of the wall structure of the container.

Referring to FIG. 3, there is shown another embodiment of the present invention. In this embodiment, the laminated sheet includes an inner layer 12 made of a polyolefin film and the barrier layer outside the inner layer 12 is constituted by a first barrier layer 13 adjacent to the inner layer 12 and a second barrier layer located outside the first barrier layer 13a. The first barrier layer 13 is made of a stretched film of polyvinylidene chloride copolymer and the second barrier layer 13a is made of a stretched film of ethylenevinylalcohol copolymer. The first barrier layer 13 and the second barrier layer 13a may be of a stretched form when it is incorporated into the laminated sheet. Then, the stretch rate will be increased during the forming step. If films of non-stretched form are used as the first and second barrier layers in providing the laminated sheet, the films are stretched only through the forming step. The outer layer is made of a film of polyolefin and the rigid layer 15 is made of a mixture of polyolefin and inorganic materials. In the case where polypropylene is used for polyolefin, the melting point is 140° to 160° C. as already mentioned. Where polyethylene is used, its melting point is 120° to 130° C. Since ethylenevinylalcohol has melting point of 170° to 190° C., there will be no problem in controlling the temperature conditions. Stretched ethlenevinylalcohol copolymer constituting the second barrier layer 13a has a gas barrier property, however, the gas barrier property will be decreased when it is exposed to an atmosphere of a high temperature and a high humidity which may an atmosphere of a retort sterilizing process. However, even if the gas barrier property is once decreased, the stretched ethlenevinylalcohol copolymer can restore the gas barrier property when it is dried. It is preferable to locate the stretched polyethylenevinylalcohol copolymer film layer 13a outside the first barrier layer 13 so that the layer 13a can be readily dried after the retort sterilization process. The stretched polyvinylidene copolymer film can be located at an inner side where drying can hardly proceed since there will be no decrease in the gas barrier property.

Figure 4:
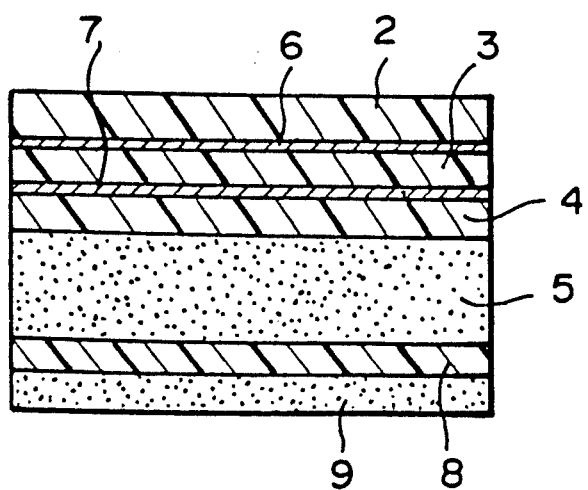
FIG. 4 is a sectional view showing a further example of the wall structure.

FIG. 4 shows a further embodiment of the present invention which includes, as in the embodiment of FIG. 1, an inner layer 2, a barrier layer 3 and an outer layer 4 which are bonded together by means of adhesive layers 6 and 7. A rigid layer 5 is located outside the outer layer 4. The inner layer 2 and the outer layer 4 are made of polyolefin. The barrier layer 3 is made of a film of stretched polyvinylidene copolymer. The rigid layer 5 is made of a mixture of polyolefin and inorganic materials. In this embodiment, there is a layer 8 made of a film of stretched ethylenevinylalcohol which is located outside the rigid layer 5. Outside the layer 8, there is a protective layer 9 made of a mixture of polyolefin and inorganic materials.

The layers 5, 8 and 9 can be made by a simultaneous extrusion of resin materials in molten form. With this extrusion process, the layer 8 of ethylenevinylalcohol copolymer will be of a non-stretched form, however, it will be stretched during the forming process. When it is desired to increase the stretch rate of the layer 8, the layer 5 may at first be formed over the laminated sheet comprising the layers 2, 3 and 4 by extruding the material in a molten state, and a stretched film of ethylenevinylalcohol copolymer is then adhesively attached to the rigid layer 5. Thereafter, the layer 9 is formed by an extrusion process. The stretch rate of the film constituting the layer 8 can further be increased when the sheet is formed into the container 1.

Figure 5:
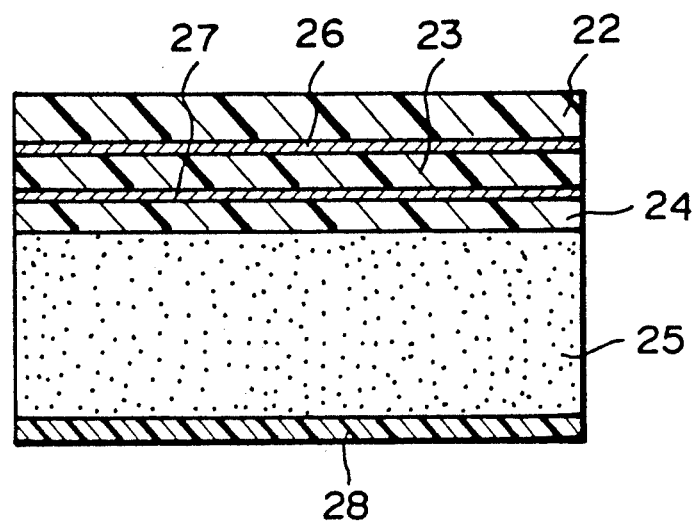
FIG. 5 is a sectional view showing a further example of the wall structure.

Description will now be made on the case where the melting point of the material for the inner layer and the outer layer and that of the material for the barrier layer are substantially the same or the melting point of the material for the inner and outer layer is to a certain degree lower than that of the material for the barrier layer. In this instance, the laminated sheet includes as shown in FIG. 5 an inner layer 22, a barrier layer 23 attached through an adhesive layer 26 to the outer surface of the inner layer 22 and an outer layer 24 attached through an adhesive layer 27 to the outer surface of the barrier layer 23. A rigid layer 25 is formed outside the outer layer 24 and a surface layer 28 is formed outside the rigid layer 28. The inner layer 22 is made of polypropylene resin and is 70 μm thick. The outer layer 24 is similarly made of polypropylene resin and is 30 μm thick. The barrier layer 23 is made of a non-stretched film of polyvinylidene chlorideacrylic acid ester copolymer having a softening point of 120 ° C. and a melting point of 160° C. and has a thickness of 50 μm. Polyurethane adhesive is used for the adhesive layers 26 and 27. The rigid layer 25 is made of a mixture of polypropylene and 30 wt % of talc and has a thickness of 1000 μm. The surface layer 28 is provided to coat the surface of the rigid layer 25 to improve the appearance and the printing property. The layer 28 may be made of polypropylene and is 50 μm thick.

Figure 6:
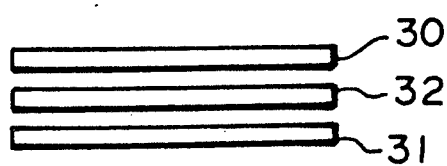
FIG. 6 is a diagrammatical illustration of a heating device.

Referring to FIG. 6, there is shown a process for heating the sheet as shown in FIG. 5. In the process, use is made of a heating apparatus including an upper heater 30 and a lower heater 31. The upper heater 30 may include six pieces of heating elements of 300 watts which are arranged in a square frame of 0.5 m long at each side. The lower heater 31 may include nine pieces of heating elements of 300 watts arranged in a similar manner as in the case of the upper heater. In the heating apparatus thus constructed, the laminated sheet 32 is placed with the inner layer 22 is laid at the upper side and a heating step is carried out. The heating process is carried out so that the heating time for the inner layer side is 12 seconds and the heating time for the surface layer side is 24 seconds. The temperature of the laminated sheet 32 is then measured. It was found that the temperature of the surface of the inner layer is 165° C. and the temperature of the surface of the surface layer 28 was 170° C., whereas the temperature of the inner layer 22 at the surface facing to the adhesive layer 26 is 150° C. and the temperature of the outer layer 24 at the side of the adhesive layer 27 was also 150° C. It will be noted that by carrying out a forming process with this temperature condition, it is possible to stretch the resin in the barrier layer 23. In a test with an actual example, a formed container was charged with hot water and a closure was attached by heat seal. Thereafter, the container was subjected to a retort sterilization process under 125° C. for 30 minutes. It has been found that there was no change in the container and the gas barrier property was improved two times better than an estimated value of a case where a non-stretched layer is used.

A similar test was made with an example in which the barrier layer 23 was made of a biaxially stretched film of polyvinylidene-acrylic acid ester copolymer having a melting point of 170° C. and a thickness of 50 μm. It was found that the gas barrier property was further improved.

Figure 7:
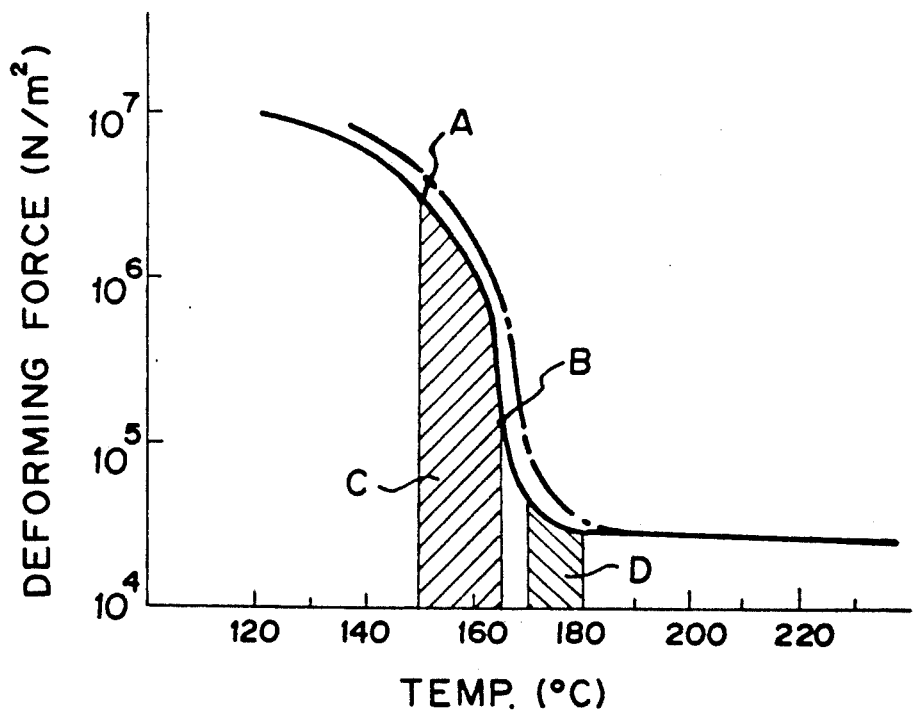
FIG. 7 is a diagram showing the temperature responsive property of resin material.

FIG. 7 is a diagram showing a typical example of the temperature responsive characteristics of polypropylene resin. In the diagram, the point A on the solid line shows the bi-cut softening point whereas the point B shows the melting point. It is preferable to conduct the forming process for producing a stretch in the shadowed area C between the bi-cut softening point A and the melting point B. It is further preferable that the forming process which does not produce a stretching at a temperature region D which is higher than the melting point B. In the case where the melting temperature of the material for the inner layer and the outer layer and the melting temperature of the material for the barrier layer are substantially the same, the heating process may be controlled so that the temperature at the boundaries of the inner and outer layers and the barrier layer is slightly lower than the melting point. Then, the substantial part of the inner and outer layers will be brought into a molten condition whereas the barrier layer will be maintained at a softened state. Therefore, it is possible to apply an adequate stretching to the barrier layer. It will be noted in FIG. 7 that in the case where the barrier layer is made of a resin material having a melting point which is higher than that of the material for the inner and outer layers, the temperature characteristics of the barrier layer will be as shown by a broken line in FIG. 7 with respect to the characteristics of the resin material for the inner and outer layers so that the heating control will become easier. In any event, the control of heat energy in a unit of time and the overall heat energy should be determined taking into account the thickness of each layer and the thermal conductivity of the resin material constituting each layer so that a desired temperature gradient can be obtained.

The laminated structure as shown in FIG. 5 can of course be used for the forming process as described with reference to the structures of FIGS. 1 through 4.

The invention has thus been shown and described with reference to specific embodiments, however, it should be noted that the invention is in no way limited to the details of the illustrated structures but changes and modifications may be made without departing from the scope of the appended claims.

We claim:

1. A container including an inner layer and an outer layer each made of a thermoplastic material, a barrier layer disposed between said inner and outer layers and made of a resin material of which gas barrier property can be improved by stretching, said barrier layer being held between the inner and outer layers with the resin material constituting the barrier layer in a stretched condition, the thermoplastic material in said inner and outer layers being in substantially non-stretched condition.

2. A container in accordance with claim 1 which includes a rigid layer of a large thickness provided outside said outer layer.

3. A container in accordance with claim 1 in which said inner and outer layers are made of at least one material selected from the group consisting of polypropylene resin high density polyethylene resin, polyethyleneterephthalate resin, polycarbonate resin and polymethyl pentene resin, said barrier layer being made of at least one material selected from the group consisting of polyvinylidene chloride copolymer, ethylenevinylalcohol copolymer, polybutyleneterephthalate, acrylonitrile, nylon-6 and metaxylenediamine condensed polymer of adipic acid.

4. A container in accordance with claim 1 in which said barrier layer includes a first layer made of stretched polyvinylidene chloride copolymer and a second layer made of stretched ethylenevinylalcohol copolymer, said first layer being located at a side adjacent to said inner layer.

5. A container in accordance with claim 2, said rigid layer includes at least one inorganic material.

6. A container for retort sterilized foodstuffs including an inner layer made of a polypropylene film in a substantially non-stretched condition, barrier means located adjacent to an outerside of said inner layer and including at least one film of stretched polyvinylidene chloride copolymer, an outer layer located adjacent to an outerside of said barrier means and made of a film of polypropylene in a substantially non-stretched condition, and a shape retaining layer made of a mixture of polypropylene and at least one inorganic material.

7. A container in accordance with claim 6 which includes a second barrier layer between said barrier means and said outer layer, said second barrier layer being made of a film of stretched ethylenevinylalcohol copolymer.

* * * * *